US009396445B2

(12) United States Patent
Rai

(10) Patent No.: US 9,396,445 B2
(45) Date of Patent: Jul. 19, 2016

(54) CONTROLLED DATA COLLECTION SYSTEM FOR IMPROVING PRINT SHOP OPERATION

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 2439 days.

(21) Appl. No.: 11/289,891

(22) Filed: Nov. 30, 2005

(65) Prior Publication Data
US 2007/0124182 A1 May 31, 2007

(51) Int. Cl.
*G06Q 10/06* (2012.01)
(52) U.S. Cl.
CPC ............ *G06Q 10/06* (2013.01); *G06Q 10/0639* (2013.01)
(58) Field of Classification Search
CPC ............................ G06Q 10/06; G06Q 10/0639
USPC .............................................................. 705/7
See application file for complete search history.

(56) References Cited

U.S. PATENT DOCUMENTS

| 5,544,348 | A | * | 8/1996 | Umeda et al. | ................... | 703/17 |
| 5,583,797 | A | * | 12/1996 | Fluegge et al. | ............... | 700/279 |
| 5,719,949 | A | * | 2/1998 | Koeln et al. | ................... | 382/113 |
| 6,678,355 | B2 | * | 1/2004 | Eringis et al. | ................... | 379/22 |
| 7,051,328 | B2 | * | 5/2006 | Rai et al. | ....................... | 718/102 |
| 7,899,707 | B1 | * | 3/2011 | Mesaros | ..................... | 705/14.66 |
| 2002/0147670 | A1 | * | 10/2002 | Lange | .............................. | 705/35 |
| 2004/0145774 | A1 | * | 7/2004 | Sesek et al. | .................. | 358/1.15 |
| 2005/0065830 | A1 | | 3/2005 | Duke et al. | | |

OTHER PUBLICATIONS

Schopf et al., "Performance Prediction in Production Environments", Computer Science and Engineering Department, University of California, San Diego, UCSD CSE Dept. Technical Report #CS97-558, Sep. 1997.*

* cited by examiner

*Primary Examiner* — Thomas L Mansfield, Jr.
(74) *Attorney, Agent, or Firm* — Fay Sharpe LLP

(57) ABSTRACT

A control system usable in a print shop where print jobs are processed with at least one print shop related resource is provided. The at least one print shop related resource is operated over multiple discrete time intervals such that production related data is generated for each one of the multiple discrete time intervals. The production related data generated during each one of the multiple discrete intervals is collected and stored in memory. The control system includes a controller and a program. The program operates with the controller to calculate at least one performance measure value from the stored production related data, and to determine, with the at least one calculated performance measure value, whether any further collection of production related data is required.

15 Claims, 9 Drawing Sheets

| tblJobs : Table | | | | | | |
|---|---|---|---|---|---|---|
| Recid | Jobid | Operation | EventType | TimeStamp | Operator | Quantity |
| 1 | 23716 | 6180_A | Start | 10/5/2004 1:46:00 PM | John | 6000 |
| 2 | 23716 | 6180_A | Stop | 10/5/2004 2:43:00 PM | John | 6000 |
| 3 | 23716 | 6180_A | Start | 10/5/2004 2:53:00 PM | John | 12000 |
| 4 | 23716 | 6180_A | Stop | 10/5/2004 5:03:00 PM | John | 12000 |

| DISTRIBUTION | AD | P | LRT P |
|---|---|---|---|
| NORMAL | 19.981 | <0.005 | |
| LOGNORMAL | 0.605 | 0.113 | |
| 3-PARAMETER LOGNORMAL | 0.564 | * | 0.724 |
| EXPONENTIAL | 8.083 | <0.003 | |
| 2-PARAMETER EXPONENTIAL | 8.065 | <0.010 | 0.169 |
| WEIBULL | 2.944 | <0.010 | |
| 3-PARAMETER WEIBULL | 2.682 | <0.005 | 0.007 |
| SMALLEST EXTREME VALUE | 25.606 | <0.010 | |
| LARGEST EXTREME VALUE | 9.234 | <0.010 | |
| GAMMA | 4.387 | <0.005 | |
| 3-PARAMETER GAMMA | 3.992 | * | 0.006 |
| LOGISTIC | 10.860 | <0.005 | |
| LOGLOGISTIC | 0.250 | >0.250 | |
| 3-PARAMETER LOGLOGISTIC | 0.271 | * | 0.643 |

| | | STANDARD | 95% NORMAL CI | |
|---|---|---|---|---|
| DISTRIBUTION | MEAN | ERROR | LOWER | UPPER |
| LOGISTIC | 2.08417 | 0.579567 | 1.20846 | 3.59448 |

FIG. 8

| DISTRIBUTION | AD | P | LRT P |
|---|---|---|---|
| NORMAL | 27.043 | <0.005 | |
| LOGNORMAL | 0.455 | 0.265 | |
| 3-PARAMETER LOGNORMAL | 0.437 | * | 0.701 |
| EXPONENTIAL | 13.714 | <0.003 | |
| 2-PARAMETER EXPONENTIAL | 13.863 | <0.010 | 0.107 |
| WEIBULL | 3.544 | <0.010 | |
| 3-PARAMETER WEIBULL | 3.103 | <0.005 | 0.002 |
| SMALLEST EXTREME VALUE | 35.427 | <0.010 | |
| LARGEST EXTREME VALUE | 14.056 | <0.010 | |
| GAMMA | 5.806 | <0.005 | |
| 3-PARAMETER GAMMA | 5.212 | * | 0.002 |
| LOGISTIC | 16.103 | <0.005 | |
| LOGLOGISTIC | 0.308 | >0.250 | |
| 3-PARAMETER LOGLOGISTIC | 0.269 | * | 0.220 |

STANDARD 95% NORMAL CI

| DISTRIBUTION | MEAN | ERROR | LOWER | UPPER |
|---|---|---|---|---|
| LOGISTIC | 2.37719 | 0.578275 | 1.47571 | 3.82937 |

*FIG. 9*

| # OF JOBS | MEAN CONFIDENCE RATIO ESTIMATES USING DISTRIBUTION IDENTIFICATION | MEAN CONFIDENCE RATIO ESTIMATES USING NORMAL DISTRIBUTION |
|---|---|---|
| 100 | 1.14 | 0.85 |
| 150 | 0.99 | 0.65 |
| 610 | 0.35 | 0.46 |

*FIG. 10*

CONTROLLED DATA COLLECTION SYSTEM FOR IMPROVING PRINT SHOP OPERATION

Cross-reference is made to U.S. patent application Ser. No. 11/094,405, filed Mar. 31, 2005, by Rai et al, Publication No. 2006/0226980, published on Oct. 12, 2006, entitled Systems and Methods for Capturing Workflow Information, the pertinent portions of which are incorporated herein by reference.

The present embodiments relate generally to a technique for operating a print shop or the like and, more specifically, to a system for controlling data collection (e.g., collection of data related to performance measures, such as job turnaround time, process cycle efficiency, and job production costs) so that useful feedback regarding the sufficiency of data collection is readily provided.

The costs for operating a print shop are generally categorized as the capitalization cost of the printing equipment, and the operating and employment costs for running the equipment. As print shops tend to transform from being lithographic to digital, additional equipment costs will be incurred, so that the manner in which the facilities of the print shops are managed becomes even more important to achieve the desired and more profitable operating results.

Print shops face regular pressures to reduce costs and improve the productivity of their printing processes. This pressure exists whether a print shop is classified as a job print shop, e.g., one producing small-run individual print jobs for customers, a transactional print shop, e.g., one producing statements for a brokerage firm, or a production print shop, e.g., one producing large-run catalogs for mail order businesses. No matter which class a print shop falls into, each print shop operates in essentially the same way. It accepts a digital file, flat sheet stack, bound material or other original as a job input, operates upon this job according to customer instructions, e.g., paper selection, binding, and distribution, and produces a final product which is then transferred and billed to the customer.

Print shops collect widely varying amounts and types of data on their equipment, jobs and labor assignments. A significant number of print shops appear to collect data for billing and the evaluation of their on-time delivery of jobs. These data may or may not contain a specification of all the processes needed to complete the job and information on how the job traverses the shop, e.g., when it enters and exits each of these processes and the operator(s) who perform the process. Few shops measure the productivity of each of their pieces of equipment and the variations in this productivity due to the use of different operators and to machine failures and their repair. Acquisition of job characteristic and status data is generally an expensive manual process.

The present inventor's unpublished prior work contemplates the acquisition of comprehensive data on, among other things, equipment, job mix, job flow and labor assignments of a print shop, typically by semi automated means such as "handhelds." A comprehensive discussion of the types of data collected in a document production environment is provided in U.S. patent application Ser. No. 10/946,756, filed Sep. 22, 2004, by Duke et al., Publication No. 20050065830, published on Mar. 24, 2005, the pertinent portions of which are incorporated herein by reference. In one example of data collection, a handheld is used to read bar codes printed on jobs in a print shop, and automatically record the jobs progress through the shop. Given these data items, improved analyses of the data using process models of the shop that are amenable to analysis relative to alternative configurations and control policies in order to assess the productivity of the shop relative to these alternatives is facilitated. Additionally, by measuring the flow of jobs at various points in the work process, and using flow metrics to characterize this flow, the state of flow in the shop at selected instants in time can be evaluated and this information used to change the scheduling of the jobs, their routing and the allocation of labor in such a fashion as to improve the flow and hence the productivity of the shop.

Despite improvements in print shop data collection, it is understood that a typical print shop operator is often forced to use intuition in determining how much data should be collected in ascertaining a given print shop related metric ("metric"). It follows that the accuracy of the given metric, such as average turnaround time (TAT mean), varies as a function of the amount of data points collected for the given metric. Hence if many data points for the given metric are collected, then the accuracy of the related metric will be quite high. Conversely, the collection of an insufficient number of data points will result in an inaccurate value for the related metric. Forcing the print shop operator to guess as to how much data should be collected for the sake of obtaining a reasonably accurate related metric is undesirable. Therefore, it would be desirable to provide a control approach for assisting the typical print shop operator (or any operator using metrics in a comparable production environment) in deciding when a sufficient amount of data, resulting in an accurate related performance metric, has been collected.

SUMMARY

In accordance with one aspect of the disclosed embodiments, there is provided a control system for use in a print shop where print jobs are processed with at least one print shop related resource. The at least one print shop related resource is operated over multiple discrete time intervals such that production related data is generated for each one of the multiple discrete time intervals. The production related data generated during each one of the multiple discrete intervals is collected and stored in memory. The control system comprises: (a) a controller and (b) a program operating with the controller to (i) calculate at least one performance measure value from the stored production related data, and (ii) determine, with the at least one calculated performance measure value, whether any further collection of production related data is required.

In accordance with another aspect of the disclosed embodiments, there is provided a control system for use in a document production facility where jobs are processed with at least one document production related resource. The at least one document production related resource is operated over multiple discrete time intervals such that production related data is generated for each one of the multiple discrete time intervals. The production related data generated during each one of the multiple discrete intervals is collected and stored in memory. The control system includes (a) a controller, and (b) software operating with said controller to control execution of (i) calculating at least one performance measure value from the stored production related data, and (ii) determining, with the at least one calculated performance measure value, whether any further collection of production related data is required.

In accordance with yet another aspect of the disclosed embodiments there is provided a method for use in a document production facility where print jobs are processed with at least one print production resource. The at least one print production resource is operated over multiple discrete time intervals such that production related data is generated for each one of the multiple discrete time intervals. The production related data generated during each one of said multiple discrete intervals is collected and stored in memory. The method comprises: calculating at least one performance measure value from the stored production related data; and determining, with the at least one calculated performance measure value, whether any further collection of production related data is required.

BRIEF DESCRIPTION OF THE DRAWINGS

FIG. 8 is a table with possible distribution fits for turnaround data from 100 job runs in a production environment; (not clear)

FIG. 9 is a table similar to the distribution fit table of FIG. 8, except that turnaround data is from 150 job runs; and FIG. 10 is a table comparing two sets of means obtained from 100, 150 and 610 jobs, respectively.

DETAILED DESCRIPTION

The following detailed description of exemplary embodiments is particularly directed to systems and methods for capturing production workflow information. The exemplary embodiments described below are particularly directed to print shop environments. Thus, the following detailed description makes specific reference to workflows wherein the workstations include printing system related devices such as printers and finishing systems. However, it should be understood that the principles and techniques described herein might be used in other production-related environments such as mailrooms, document scanning centers and other services operations involving equipment that requires manual handling.

Figure 1:
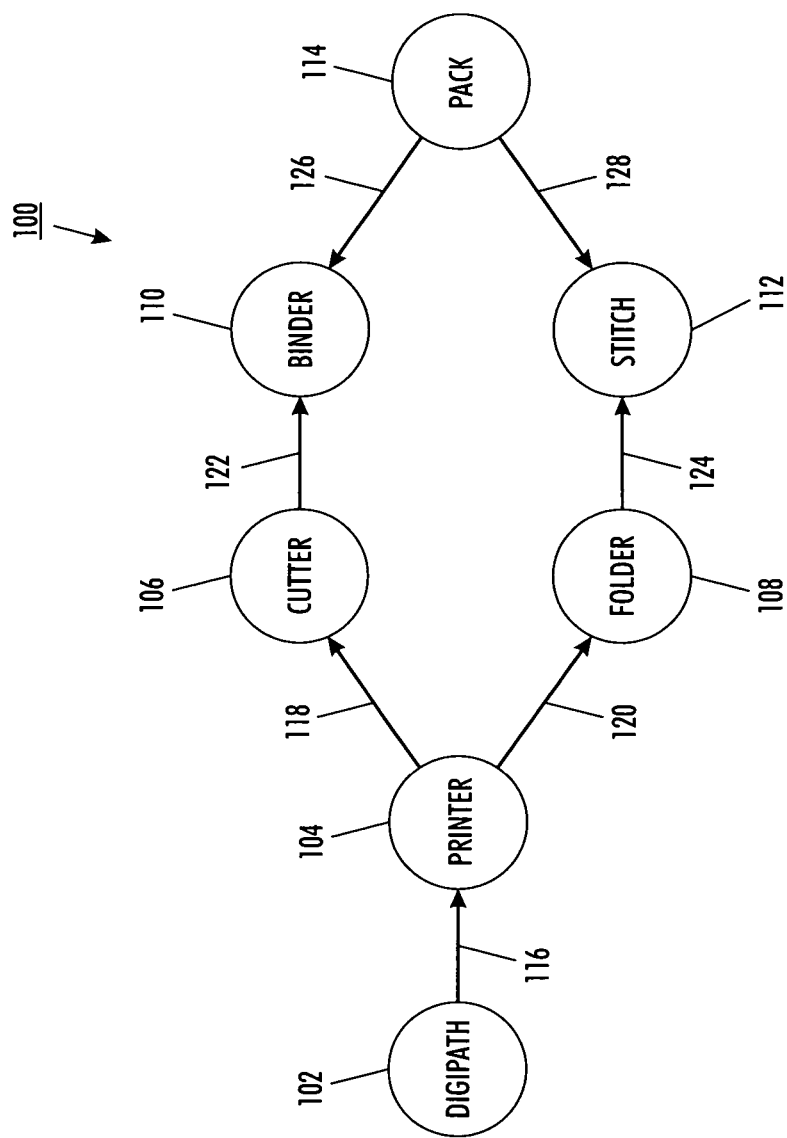
FIG. 1 is a block diagram of a print production workflow.

As shown in the exemplary workflow schematic of FIG. 1, a workflow, determining the flow of the job from one workstation to another, may be represented as a directed graph illustrating workstations 102-114 and directed arcs 116-128. The exemplary systems and methods discussed below disclose how one collects information regarding events happening at each workstation 102-114 in a workflow 100 as a print job progresses from one workstation to another.

In the exemplary workflow of FIG. 1, a print production workflow includes: creating a print job at a job creation platform or workstation 102 (Xerox Corporation sells a job creation application know as "Digipath;" progressing to a printer workstation 104 via arc 116; and outputting some quantity of printer output to a cutter workstation 106 via arc 118. The output of the cutter workstation 106 may be directed, via arc 122, to a binder workstation 110, the output of which is directed via arc 126 to a packing workstation 114. In parallel with the cutting, binding and packing of some of the print job output, a portion of the output from printer workstation 104 may be directed via arc 120 to folder workstation 108. The folded output may then be directed via arc 124 to a stitching workstation 112, after which the stitched output may be directed via arc 128 to the packing workstation 114.

At each workstation 102-114, certain types or quantities of workflow information may be of interest and may be collected. A set of information types ("attributes") collected regarding to the production at each workstation may include but is not limited to:

JobId: A unique identifier that captures the information on the job itself.

StationID: A unique identifier that identifies the workstation performing the task.

OperatorID: A unique identifier that identifies the operator working on the particular job at the particular station.

EventId: One of a set of event types that includes identification of the event (e.g. Start, Stop, Interrupt, Restart, etc.)

Quantity: The quantity of work product to be produced at the particular StationID by the particular OperatorID for that particular JobId.

Figure 2:
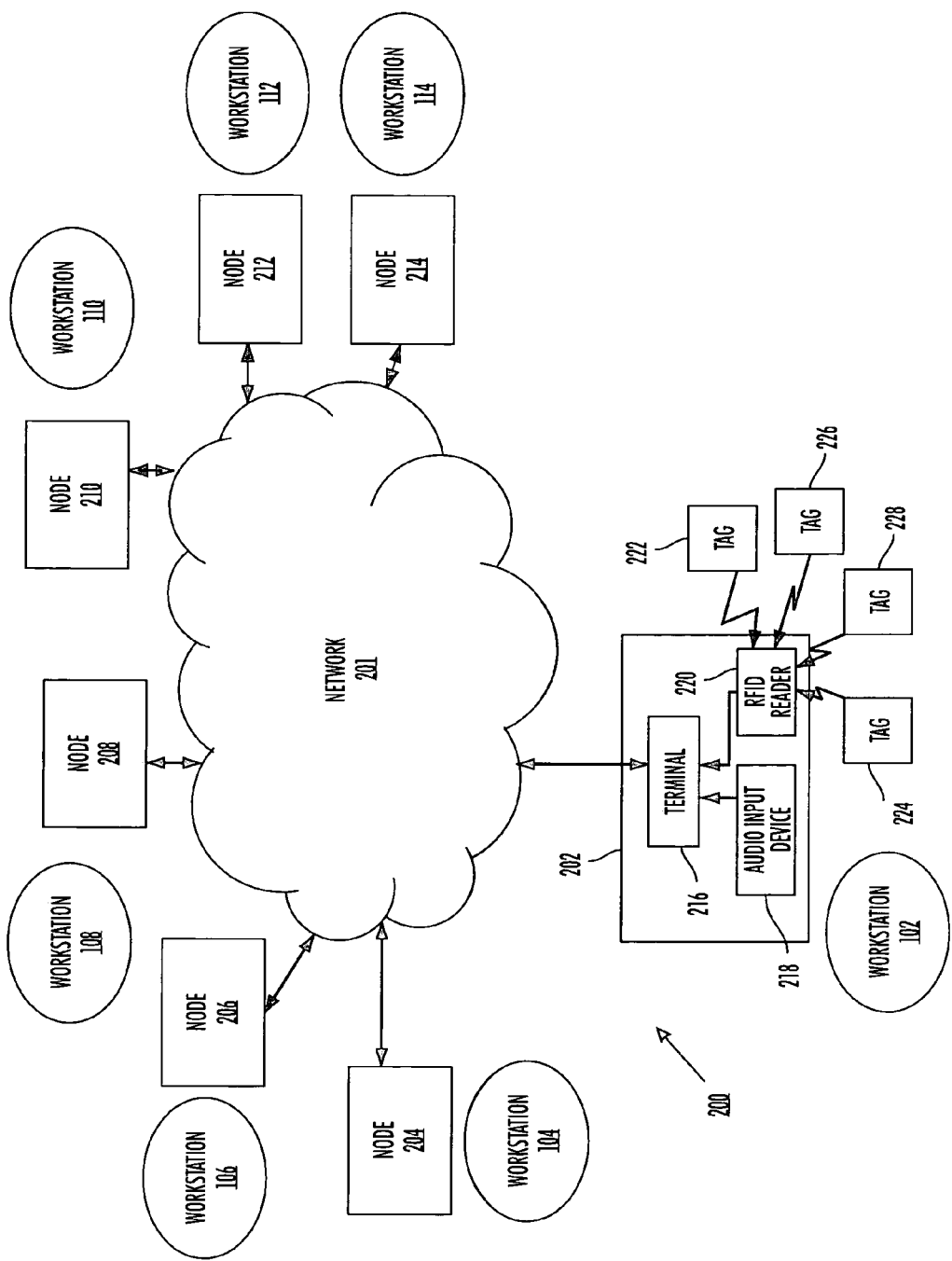
FIG. 2 is a block diagram of a system by which workflow information from multiple workstations spaced across a network may be captured.

FIG. 2 illustrates a high-level block diagram of a system 200 for capturing production workflow information across a network 201 providing a plurality of workstations 102-114 as identified in FIG. 1. In one example of the disclosed embodiments, RFID technology, incorporating RF tags and RFID readers are used to capture the workflow information. Tracking node 202-214 may be located in close proximity to respective workstation 102-114 and include a communications device 216, a RFID reader 220 and a voice input device 218.

As disclosed herein, tracking data for each of workstations 102-114 is captured and transmitted to the appropriate destination through devices 202-214. The communications device 216, in one instance, includes a computer or other hardware device in electrical communication with the network 201, and transmits the data captured by the RF reader 220 and the voice input device 218 to the computer network 201. Although the exemplary block diagram of FIG. 2 illustrates the functions of the communications device 216, the RF reader 220 and the voice input device 218 as distinct blocks, the physical location of the components performing the function is non-limiting and may be located in a single device or a plurality of discrete components.

Per one aspect of the disclosed embodiments, the JobId information would be encoded on a JobId tag 222 that be attached to paperwork associated, and traveling with, a particular print job. A workstation operator might, in one instance, would wear an OperatorId tag 224, such as a wristband or ID badge with an RF tag disposed thereon. Similarly, each one of workstations 102-114 can be provided with a unique StationId tag 226 mounted in close proximity to its respective workstation 102. EventId tags 228 might be attached to tokens available to the operator and could be colored and marked for ease of use.

The voice input device 218 may accept verbally spoken data after the RF tags 222-228 are read. In one exemplary embodiment, the verbally entered data would be quantity data pertaining to the output of a particular workstation, such as the number of pages. The verbally entered data, however, is not limited to any particular type of information. Speech recognition software converts the verbally entered information to electronically storable data, and can be collocated with the voice input device, located in the device 216, on the network 201, or in any convenient location.

Figure 3:
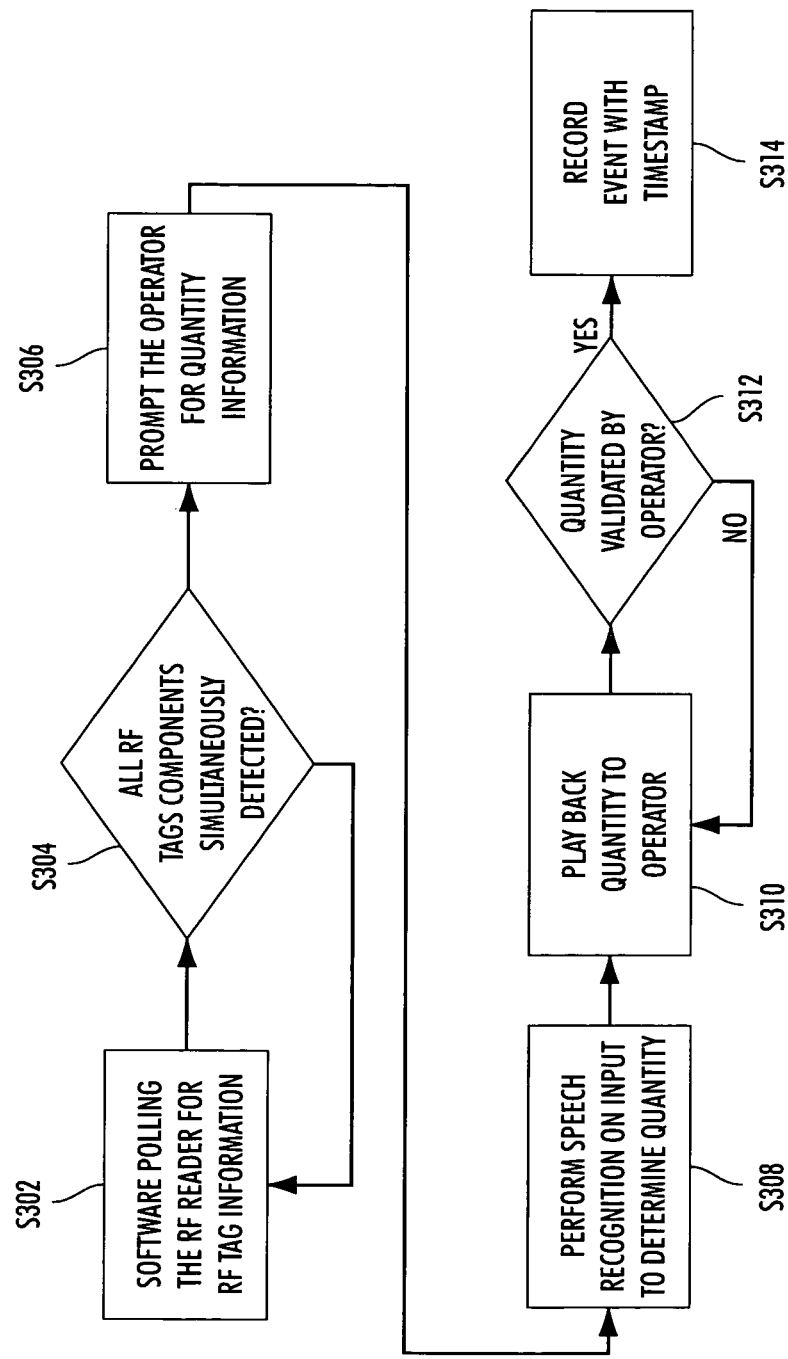
FIG. 3 is a flow chart for recording events at a workstation using RFID and speech recognition technologies according the collection system of FIG. 1.

FIG. 3 illustrates an exemplary flowchart capturing workflow information for workstation 102 and node 202, using RFID and speech recognition technologies. At step S302, software, either local to the node 202 or distributed on the network 201, continuously polls the RF reader 220 for the proximate presence of RF tags. As discussed above, the StationId tag can be mounted to the workstation in close proximity to the node 202. Collocating the workstation 102, the StationId tag 224 and the RF reader 220 allows an operator to enter workflow information by simply performing the required workstation operation while being within scanning range of the RF reader 220. Such an exemplary embodiment would make the task of data entry easy and non-obtrusive.

At step S304, the system 100 may require all RF tags 222-228 associated with an event to be scanned by the RF reader 220 within a predetermined time, once a first tag has been detected. After all RF tag information has been scanned, the operator is, in one example, prompted to enter verbal information at step S306. The node 202 prompts the operator by a visual indication, an audible indication or other alerting mechanism by which the operator is prompted to enter data. In an exemplary embodiment, the operator is prompted to verbally enter quantity information. At step S308, speech recognition software may convert the audio response to computer readable data.

Accuracy of input data may be important to preferred operation. To minimize the possibility of error, the output of the speech recognition software may be converted back to audio at step S310 to allow the operator to validate the quantity at step S312. Validation can include a simple verbal reply, in which case the data is accepted, or a negative affirmation in which case the operator is prompted to reenter the quantity. Once the verbal information is accepted, a timestamp, associated with the data entered, is preferably stored at step S314. The timestamp includes, among other things, the date and time that a new event started to collect data, and/or a record of the time when all the data was collected by the reader 220, sent to the network 201, or alternatively, read by the network 201. Alternatively, the network 201 generates the timestamp information and does not have to be a data element required to be sent by the node 202-214.

In one embodiment, the collected data for a node is transmitted to the network in real time as the data is collected. In an alternate embodiment, the information from all the tags and the voice input is collected at the node 202 and transmitted to the network, along with the timestamp, in one transmission.

Figure 4:
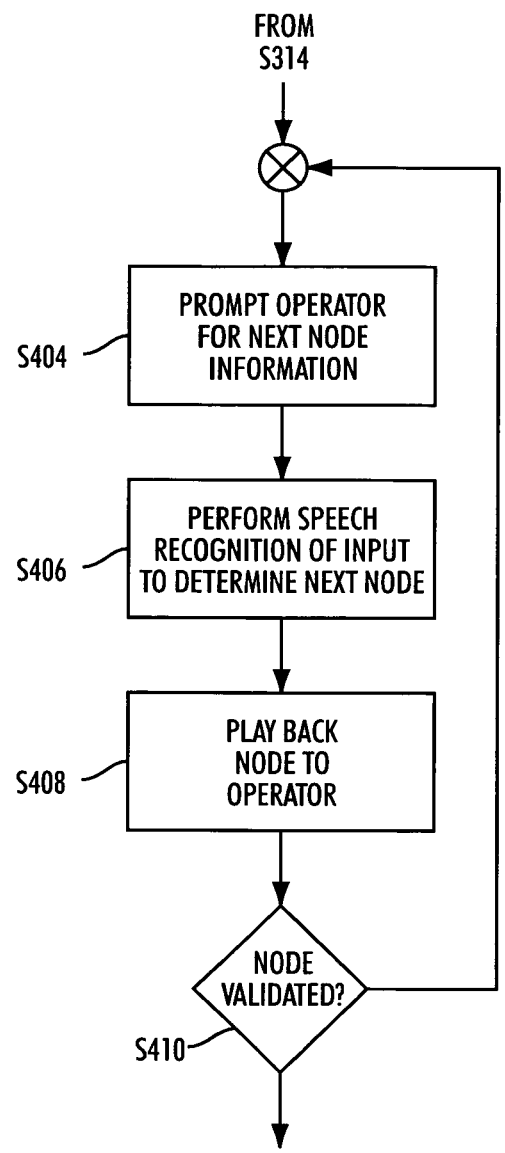
FIG. 4 is a flow chart with further process to be used in conjunction with the flowchart of FIG. 3, including the collection of data identifying the next station.

As shown in the exemplary flowchart in FIG. 4, recording a next subsequent node in the workflow further enhances the functionality of the tracking system 100. Upon completion of step S314, the operator may be prompted at step S404 for information regarding the next node in the workflow process 100. The prompt could be verbal, visual or in any form that will elicit a response. The response identifying the next node could be verbal, in which case speech recognition is performed at step S406 to convert the verbal response to computer storable data. An audio signal may then be regenerated from the converted data and presented to the operator at step S408 for verification S410. If the entered data is not validated, the operator is prompted to renter the next node information at step S404. In another exemplary embodiment, the previous node is recorded at the current workstation to provide positive linkage between nodes.

Upon completion of data capture at a particular node, the process may be repeated at subsequent nodes in the workflow. Based upon the next node information collected in FIG. 4, detailed workflow diagrams can be unambiguously and automatically generated from the event data logs.

As will appear, the above-described system for capturing production workflow information can be effectively employed for enhancing the collection of production related data corresponding with performance measures. These performance measures may include, among other things, job turnaround time, process cycle efficiency, production costs, utilization. Moreover, it should be appreciated that an operator can use a wireless handheld device 500 (FIG. 5(*a*)), such as a "personal digital assistant," pursuant to using the above-described data capture system, for collecting information or data pertaining to production events. The production related data for each event might include the above-mentioned attributes (described with respect to the types or quantities of workflow information that may be of interest at each workstation 102-114).

Figures 5A, 5B:
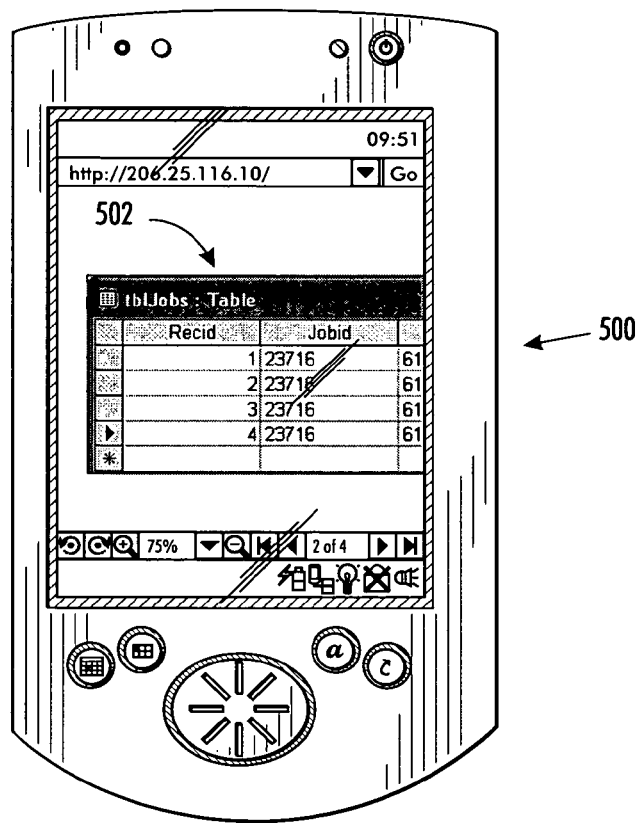
FIG. 5(a) is a planar view of a computer-based handheld device adapted for use of production related data in accordance with the disclosed embodiments.
FIG. 5(b) is a schematic, planar view of a database stored in the handheld device (or in the memory of another computer communicating with the handheld) of FIG. 5(a)

Referring to FIG. 5(*b*), time stamp information and a log of time stamps can be captured and stored in the database 502. This type of information is particularly useful in assessing turnaround time ("TAT"). While much of the following description uses TAT as an exemplary performance measure in discussing disclosed embodiments, it should be understood that the teachings of the disclosed embodiments pertains to a very wide range of performance measurements. Also, while the disclosed embodiments tend to focus on the use of performance measurements in a document production environment, one of ordinary skill in the area of enterprise optimization will readily envision many uses of the disclosed embodiments in various production environments, such as a wide range of manufacturing environments.

Figure 6A:
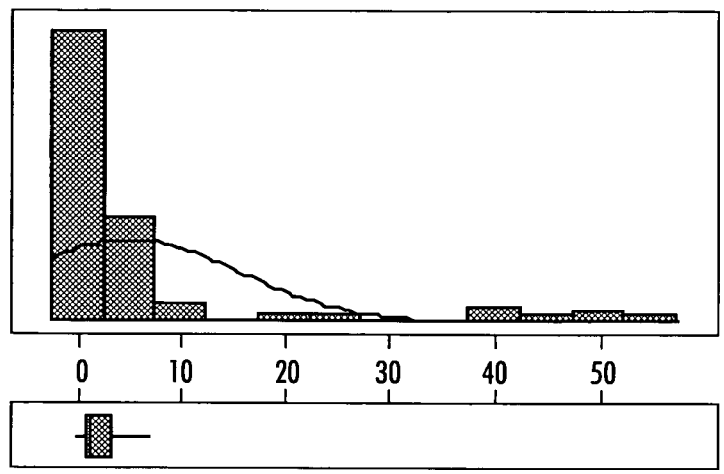
FIG. 6(a) is a histogram depicting an exemplary distribution of job turnaround time.
Figure 6B:
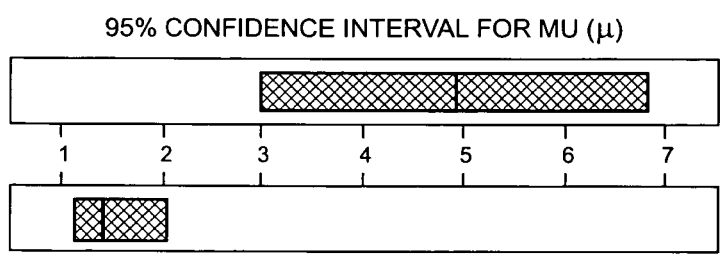
FIG. 6(b) are bar charts, based on the data of FIG. 6(a), illustrating the 95% confidence interval for mu and 95% confidence interval for median.

As events occur in a production environment (such as the completion of a job), corresponding production related data (such as TAT related data) is collected. At any given time, an average for a performance measure, such as TAT mean or median, can be computed on the basis of a current dataset. However, as is well understood by those skilled in the art, for any given dataset there is a confidence interval associated with estimation of these averages. For instance, referring to FIGS. 6(*a*) and 6(*b*), the distribution of job TAT data is shown along with corresponding values for means, medians and associated confidence intervals. It is also know that as more data is accumulated over time, the 95% confidence interval will become tighter and tighter. To facilitate data processing, two parameters, namely, mean confidence ratio (=95% confidence interval of mean)/(mean value of the distribution) and median confidence ratio (=(95% confidence interval of median)/(median value of the distribution) are defined. Prior to establishing baseline metrics, a pre-defined value of the mean confidence ratio and median confidence ratio is calculated. For example, a value of 0.3 for the mean confidence ratio implies that the spread in the confidence interval for the mean is 30% of the mean value (similarly for median).

Figure 7:
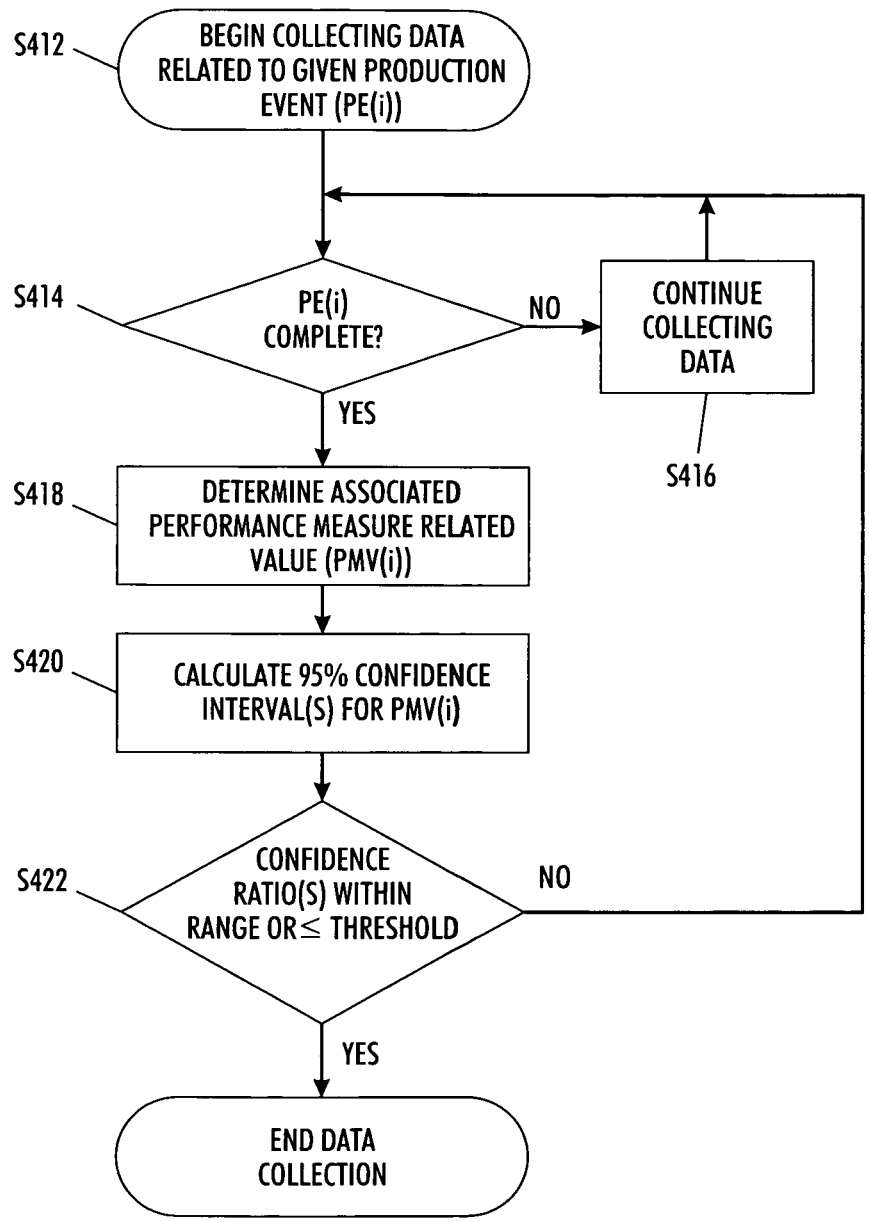
FIG. 7 is a flowchart illustrating an exemplary approach for processing production data corresponding to a performance measure.

Referring now to FIG. 7, an exemplary approach for processing a set of production data (referred to below as "dataset") corresponding to a performance measure (such as TAT) is described in further detail. As contemplated by the exemplary approach, data is collected (pursuant to S412, S414 and S416) until a complete dataset is compiled. For instance, when the performance measure is TAT, every time a job or production event (PE(i)) is completed (as detected at S416), TAT is calculated by subtracting the arrival date from the completion date and measuring the difference in shop hours (i.e. the hours in the interval that the shop is open).

Once the collection of a dataset is complete, a determination (via S418) regarding an associated performance measure related value (PMV(i)); including, for example mean (mu) or median value) for all of the datasets collected during prior and current production events is made. Pursuant to making such determination, a distribution, which best describes the performance metric distribution is identified. Standard statistical tools, such as Minitab software, can be utilized for making such identification.

By way of example, in FIG. 8, TAT data associated with 100 jobs processed in a suitable production environment, is shown. The corresponding best distribution is determined by comparing p-values in accordance with the above-mentioned identification method. In the specific example of FIG. 8, the p-value of loglogistic distribution is the highest, so it follows that the TAT data is described by a loglogistic distribution. As will appear, simply assuming that the distribution corresponds with a normal distribution can lead to misleading, and possibly even inaccurate results. Referring to S420 (FIG. 7) and the bottom of FIG. 8, the 95% confidence interval for the mean of the performance measure is shown. It will be appreciated that that the 95% confidence interval for the median can be calculated in a manner similar to that used in calculating the 95% confidence interval for the mean.

By reference to the 95% confidence interval for the mean, the Mean Confidence Ratio is calculated. In the example of FIG. 8; the Mean Confidence Ratio (MCR)=(3.59448-1.20846)/2.08417=1.14. In the disclosed approach of FIG. 7, MCR is, at S422, compared to a prespecified or threshold value. As should be appreciated, a number of ways could be used to determine if the PMV(i) has assumed a statistically reasonable value. For instance, data sufficiency might be gagged by comparing the current value of PMV(i) with a preset reference, or by considering whether a given mean fits within a preselected range (possibly defined by the 95% confidence interval for the mean). If a prespecified MCR for the above example were set at 0.4, and if the value for 100 jobs were 1.14, then further data collection would be desired for obtaining an acceptable performance measure related value (in this case the mean). The process of FIG. 7 can be performed every time a PE(i) occurs in the shop. These calculations can be performed automatically and when the MCR drops below the threshold (or when some other requirement of data collection sufficiency is met), then data collection, for the purpose of determining a given PMV(i), can be halted.

To investigate the effect of data collection on Confidence Ratio (and hence data collection sufficiency) in the above example, TAT data was collected for another 50 jobs. Referring to FIG. 9, the distribution for 150 jobs is again best described by a loglogistic distribution, and the MCR= (3.82937-1.47571)/2.37719=0.99. Even the difference between MCR for 100 and 150 job runs should make it clear that additional data collection leads to improvement in predicting actual distribution as well as spread in the values. In fact, when the above analysis was performed for 610 jobs, the best distribution fit was lognormal and the mean confidence ratio=0.347.

Referring to FIG. 10, two results of the above-mentioned investigation are affirmed. First, as more data is collected, the MCR decreases, thus indicating that the 95% confidence interval for mean is getting tighter and tighter. Second, making the assumption that the distribution of collected data is normal can lead to erroneous results since the distribution type may not be normal and the mean confidence ratio(s) for one distribution may vary significantly relative to the mean confidence ratio(s) for another distribution.

Various features, among others, should appear from the description above (and the claims following below):

First, a statistically based technique (including a system and method) for evaluating the sufficiency of data collection in a document production facility, such as a print shop, is provided. The technique permits the sufficiency of collected production data to be automatically determined on a production-event-by-production-event basis. In particular, upon collecting a production dataset, performance measure related values can be readily calculated and used to determine whether further collection of production related data is required. In one example a mean and confidence interval for the mean are used to obtain a confidence ratio. By comparing the confidence ratio to a pre-selected threshold value, automatic determination referred to immediately above can be readily obtained.

Second, much of the functionality described above can be provided in a handheld computer based device. In one example, the computer of the device operates with software that, with relatively straightforward programming, implements the features of the disclosed embodiments. Accordingly, in one example, such features are provided to a user, via a compact package, for easy use in the palm of a hand.

Finally, pursuant to determining performance measure values (such as related mean and median values), corresponding production related data is, in accordance with the disclosed embodiments, fitted to one of several statistical distribution types. The present inventor has found that simply assuming the production related data fit an often-used distribution (such as a normal distribution) can lead to misleading, or even inaccurate, results. Hence, it is believed that more accurate performance measure values are generally obtained by use of the above-described distribution identification approach.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A network computer for collecting production workflow information in a print shop environment where print jobs are processed with at least one print shop related resource, the network computer comprising a processor and a database that stores turnaround times maintained as a log of time stamps, wherein the processor being programmed to:

acquire over a network production related data for a first production related resource from an RFID reader in communication with the network computer, fit the production related data to possible distributions;

identify from the possible distributions a distribution that best represents the production related data;

compute a confidence ratio estimate of the identified distribution;

compare the confidence ratio estimate to a threshold;

generate a data collection decision by comparing the confidence ratio estimate to the threshold;

continue receiving the production related data in response to the confidence ratio estimate not meeting the threshold;

end a collection of the production related data in response to the confidence ratio estimate meeting or exceeding the threshold; and transmit over the network the recorded production related data to a user handheld computer device different from the network computer and associated with a second production related resource, wherein the transmission of the recorded production related data represents that the production related data collected for the first production related resource is sufficient for evaluating a productivity state of the production facility and enables a workflow diagram to be generated using the production related.

2. The control system of claim 1, wherein the computer processor is embedded in a handheld device.

3. A control system usable in a production facility where jobs are processed with at least one production related resource, wherein the at least one production related resource is operated over multiple discrete time intervals, production related data is generated for each one of the multiple discrete time intervals, and wherein the production related data generated during each one of the multiple discrete intervals is collected and stored in memory, the control system comprising:

a computer processor in communication with a network and operating a non-transitory computer-readable program stored on a tangible storage device, the computer processor being configured to:
receive the production related data;
fit the production related data to possible distributions;
identify a distribution that best represents the production related data;
compute a confidence ratio estimate of the identified distribution;
compare the confidence ratio estimate to a threshold;
in response to the confidence ratio estimate meeting the threshold, halt a collection of the production related data and associate the production related data as being sufficient for evaluating a productivity state of the production facility; and,
in response to the at least one calculated performance measure value not meeting the threshold, continue receiving the production related data.

4. The control system of claim 3, wherein the production facility comprises a document production facility, each job comprises a document related job, and the at least one production related resource comprises a document production related resource.

5. The control system of claim 3, wherein the processor is further configured to: before comparing the confidence ratio estimate to the threshold, compute a confidence interval for the production related data.

6. The control system of claim 3, wherein the computer processor is embedded in a handheld device.

7. The control system of claim 6, in which the handheld device includes memory, further comprising buffering at least one of the production related data in the memory of the handheld device.

8. The control system of claim 3, wherein a first possible distribution comprises a normal distribution and a second possible distribution comprises a distribution other than a normal distribution.

9. A method usable in a production facility where jobs are processed with at least one production related resource, wherein the at least one production related resource is operated over multiple discrete time intervals such that production related data is generated for each one of the multiple discrete time intervals, and wherein the production related data generated for each one of the multiple discrete intervals is collected and stored in memory, the method comprising:

receiving a production workflow at a network computer in proximity to a first production related resource for the first production related resource to process a print job;
acquiring production related data at a network computer transmitted from an RFID reader in communication with the network computer over a network, the network computer comprising a processor and a database that stores turnaround times maintained as a log of time stamps, wherein the processor:
fits the production related data to possible distributions;
identifies a distribution that best represents the production related data;
computes a confidence ratio estimate of the identified distribution;
compares the confidence ratio estimate to a threshold;
generates a data collection decision by comparing the confidence ratio estimate to the threshold;
continues receiving the production related data in response to the confidence ratio estimate not meeting the threshold;
ends a collection of the production related data in response to the confidence ratio estimate meeting or exceeding the threshold; and
transmits over the network the recorded production related data to a user handheld computer device different from the network computer and associated with a second production related resource, wherein the transmission of the recorded production related data represents that the production related data collected for the first production related resource is sufficient for evaluating a productivity state of the production facility and enables a workflow diagram to be generated using the production related data.

10. The method of claim 9, wherein the method includes configuring the production facility as a document production facility, providing a document related job for each job, and providing at least one document production related resource for the at least one production related resource.

11. The method of claim 9, further comprising: before comparing the confidence ratio estimate to the threshold, calculating a confidence interval for the production related data.

12. The method of claim 9, wherein the network computer is a handheld computing device.

13. The method of claim 12, in which the handheld computing device includes memory, further comprising buffering at least one of the production related data in the memory of the handheld computing device.

14. The method of claim 9, in which a first possible distribution comprises a normal distribution and a second possible distribution comprises a distribution other than a normal distribution.

15. The method of claim 1, wherein the first possible distribution comprises a normal distribution and the second possible distribution comprises a distribution other than a normal distribution.

* * * * *